US012679524B2

(12) United States Patent (10) Patent No.: US 12,679,524 B2
Fink et al. (45) Date of Patent: Jul. 14, 2026

(54) ROTARY WING AIRCRAFT WITH TWO ENGINES AND LATERAL ENGINE FIXATIONS

(71) Applicant: AIRBUS HELICOPTERS DEUTSCHLAND GMBH, Donauwörth (DE)

(72) Inventors: Axel Fink, Donauwörth (DE); Manuel Kempf, Donauwörth (DE); Philipp Walch, Rain am Lech (DE); Luca Specht, Petershausen (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 0 days.

(21) Appl. No.: 19/329,386

(22) Filed: Sep. 15, 2025

(65) Prior Publication Data

US 2026/0159216 A1 Jun. 11, 2026

(30) Foreign Application Priority Data

Dec. 10, 2024 (EP) .................................... 24218817

(51) Int. Cl.
*B64C 1/16* (2006.01)
*B64C 27/00* (2006.01)
(Continued)

(52) U.S. Cl.
CPC .............. *B64C 1/16* (2013.01); *B64C 27/006* (2013.01); *B64C 27/04* (2013.01); *B64C 27/12* (2013.01); *B64D 2045/009* (2013.01)

(58) Field of Classification Search
CPC ........... B64C 1/16; B64C 1/10; B64C 27/006; B64D 2045/347; A62C 3/08
See application file for complete search history.

(56) References Cited

U.S. PATENT DOCUMENTS 3,002,710 A * 10/1961 Marchetti ............... B64C 27/12
244/17.17
3,255,825 A * 6/1966 Mouille .................. B64C 27/12
244/60

(Continued)

FOREIGN PATENT DOCUMENTS

EP 3932801 B1 5/2022
EP 4071046 A1 10/2022
EP 4458669 A1 11/2024

OTHER PUBLICATIONS

European Search Report for European Application No. EP 24218817. 5, Completed by the European Patent Office, Dated May 7, 2025. 6 pages.

*Primary Examiner* — Richard Green

(74) *Attorney, Agent, or Firm* — BROOKS KUSHMAN P.C.

(57) ABSTRACT

A rotary wing aircraft comprising an upper primary skin that separates an aircraft interior region from an aircraft upper deck. The aircraft upper deck comprises engine compartments, a tail rotor drive shaft arranged therebetween, a firewall arrangement, and a central bracket that is rigidly attached to the upper primary skin below the tail rotor drive shaft 12c. The central bracket provides central bracket lugs in the engine compartments above the firewall. The engine compartments comprise inboard fixations with inner main mounting brackets adapted for being rigidly attached to engines and to inboard lateral mounts that attach the inner main mounting bracket with the central bracket lugs.

15 Claims, 5 Drawing Sheets

(51) Int. Cl.

| | | |
|---|---|---|
| *B64C 27/04* | (2006.01) | |
| *B64C 27/12* | (2006.01) | |
| *B64D 45/00* | (2006.01) | |

(56) References Cited

U.S. PATENT DOCUMENTS

| | | | | |
|---|---|---|---|---|
| 4,177,693 | A * | 12/1979 | Ivanko | B64C 27/12 |
| | | | | 244/17.27 |
| 10,427,775 | B2 * | 10/2019 | Mores | B64C 1/16 |
| 10,669,038 | B2 | 6/2020 | Scannell et al. | |
| 11,655,017 | B2 * | 5/2023 | Vayssiere | B64C 27/006 |
| | | | | 244/119 |
| 11,820,485 | B2 * | 11/2023 | Fink | B64C 27/006 |
| 11,912,402 | B2 * | 2/2024 | Vayssiere | B64C 27/006 |
| 12,582,853 | B2 * | 3/2026 | Carr | A62C 2/06 |
| 2018/0126199 | A1 | 5/2018 | Thornton et al. | |

* cited by examiner

ROTARY WING AIRCRAFT WITH TWO ENGINES AND LATERAL ENGINE FIXATIONS

CROSS-REFERENCE TO RELATED APPLICATION

This application claims priority to European patent application No. EP 24218817.5 filed on Dec. 10, 2024, the disclosure of which is incorporated in its entirety by reference herein.

TECHNICAL FIELD

The present disclosure relates to a rotary wing aircraft with a fuselage that forms an aircraft interior region, the fuselage comprising an upper primary skin that separates the aircraft interior region from an aircraft upper deck arranged above the fuselage, the upper primary skin being mounted on top of a predetermined number of supporting beams, wherein the aircraft upper deck comprises a first engine compartment at a starboard side and a second engine compartment arranged at a port side, a tail rotor drive shaft that is arranged between the engine compartments, and a firewall arrangement that defines fire proof separations among the two engine compartments, the tail rotor drive shaft, and the upper primary skin.

BACKGROUND

In a rotary wing aircraft, such as a small or medium-size helicopter, an associated fuselage typically comprises an upper primary skin that separates an aircraft interior region, which is formed by the fuselage, from an aircraft upper deck arranged above the fuselage. The aircraft interior region usually accommodates at least a cockpit and may further accommodate a cabin for passengers and/or cargo.

The aircraft upper deck generally includes an engine accommodating region that accommodates one or more engines, typically air breathing gas turbines, and that is, therefore, also referred to as the "engine deck". The one or more engines are adapted for driving the rotary wing aircraft, e.g., by providing power to an associated power distribution unit, such as a gear box, which then provides this power to a suitable propelling unit, such as e.g., a rotor, propeller or other.

Typically, the engines are arranged outside of the aircraft interior region, on top of the fuselage and close to the other main components of a respective powerplant, the main gear box and the main rotor. This is crucial for the entire aircraft performance, safety and reliability.

More specifically, according to airworthiness certification regulations the engine deck of a given rotary wing aircraft must be fire proof in a fire event. Basically, each engine has to be isolated from the rest of the rotary wing aircraft and the engine deck has to be designed such as to prevent corrosion and to prevent hazardous substances passing from a respective engine compartment to other parts of the rotary wing aircraft. Moreover, an associated primary structure enclosed within the engine compartment has to be capable of sustaining limit load during a fire event of 15 minutes of duration. Adequate assumptions have to be made regarding a possible size and location of damage on the primary structure of the rotary wing aircraft. No burn through or backside flame ignition is acceptable and respectively employed materials must behave self-extinguishing after flame exposure. These measures are independent of additional fire extinguishing systems.

In particular, the engine deck must be capable of sustaining service temperatures without deterioration of load carrying or fire proof capabilities. Respective operating temperatures acting on the aircraft upper deck as a whole are a result of the heat radiation of the engines and are essentially a function of the location within the engine compartment, the engine proximity, the compartment design and the engine characteristics among others. Typically, higher temperatures are present at the rear section of the engine compartment close to an associated engine combustion chamber and an associated exhaust. In fact, typical operating temperatures of the engine deck range from about 70° C. to 300° C.

As a result, each engine compartment and, more generally, the engine deck as a whole is equipped with a suitable firewall arrangement which forms a fire protection zone. The fire protection zone accommodates the engines within the firewall arrangement such that the firewall arrangement defines a fire proof separation between the engines, towards the forward and aft regions of the engine deck and the aircraft interior region formed by the fuselage of a given rotary wing aircraft.

More specifically, a firewall arrangement in an engine deck is typically delimited by the upper primary skin of the fuselage that forms a lower firewall, as well as by a front firewall, a rear firewall, and a cowling that represents an upper loft of a given rotary wing aircraft and covers the engine deck. If the rotary wing aircraft is a twin-engine aircraft, both engines are usually separated from each other by a center firewall protecting both engines from each other. In any case, the engines are attached to the upper primary skin and corresponding framework members such as beams or frames by means of several engine mounts. The front firewall and the rear firewall represent a barrier to respective front and rear portions of a given aircraft upper deck. The cowling is usually at least partially removable to provide access to the engines.

An illustrative firewall arrangement is described in the document EP 3 932 801 B1. More generally, the document EP 3 932 801 B1 describes a rotary wing aircraft with a fuselage that forms an aircraft interior region, the fuselage comprising an upper primary skin that separates the aircraft interior region from an aircraft upper deck arranged above the fuselage. The aircraft upper deck comprises an engine accommodating region with a firewall arrangement which accommodates two aircraft engines within the firewall arrangement such that the firewall arrangement defines a fire proof separation at least between the two aircraft engines and the aircraft interior region. The firewall arrangement comprises a mid-firewall that separates the two engines from each other and further comprises, for each engine, a front firewall, a rear firewall, and a funnel-shaped lower firewall that is arranged between the aircraft engine and the upper primary skin of the fuselage. The funnel-shaped lower firewall converges from an outer perimeter to at least one inner collecting point. The outer perimeter is spaced apart from the upper primary skin of the fuselage and at least attached to the front firewall and the rear firewall.

More specifically, the funnel-shaped lower firewall features a particular funnel shape ensuring drainage and a specific separation distance with respect to respective primary structural elements of the aircraft upper deck which are to be protected. The particular funnel shape requires an interpenetration of the upper primary skin plane, leading to a cut-out of the upper primary skin. Thus, a respective lowest point of the funnel-shaped lower firewall is arranged in vertical direction of the rotary wing aircraft below the upper primary skin plane and incorporates a drainage point. The separation distance is an essential feature targeting an efficient protection of the aircraft upper deck's structural elements.

Furthermore, inside the firewall arrangement each aircraft engine is usually attached to a set of engine fixations which have to ensure an overall isostatic characteristic in order to avoid any constraining parasitic loading on either the aircraft engine or the fuselage as a result of relative, thermally or elastically induced dilatations and deformations. In general, at least three engine fixation points are provided on a respective casing of each aircraft engine. A set of mounts is attached to these engine fixation points and connects associated fixed brackets provided on the respective primary structural elements of the aircraft upper deck, such as e.g., the supporting beams. Similarly, in a conventionally implemented engine accommodating region on an aircraft upper deck that is formed as a titanium deck provided with a certain fire proofness instead of being provided with the firewall arrangement with the funnel-shaped lower firewall between the engine and the upper deck, the set of mounts is arranged on top of the titanium deck and interconnects respective supporting members below the upper primary deck so that the mounts bridge the distance between the engine fixation points and the fixed brackets provided on the respective primary structural elements of the aircraft upper deck. Typical mounts show a bipod machined design or a framework of struts.

Turning now back to the document EP 3 932 801 B1 which addresses the engine fixation points and the set of mounts within the perimeter of the funnel-shaped upper firewall, but which is entirely silent about the way of arranging them in order to ensure an undisturbed mechanical load path between the engine fixation points of the aircraft engines and the aircraft upper deck below the funnel-shaped lower firewall. This document is also silent on how to maintain a required fire-proofness capability within respective intersection points between the mechanical load path and the interposed funnel-shaped lower firewall, on how to minimize a respective mechanical interaction between the mechanical load path and the funnel-shaped lower firewall, and on how to allow an easy dismountability of the aircraft engine and the funnel-shaped lower firewall.

Document EP 4 458 669 A1, in turn, describes a firewall arrangement comprising an interposed firewall as a funnel-shaped lower firewall arranged between the aircraft engine and the upper primary skin of the fuselage. The aircraft engine is fixed at two front main mounts, an inner lateral mount, and a rear mount that are mounted to mount brackets. The mount brackets are at least partly extending through through-holes of the funnel-shaped lower firewall. However, this document is silent on how to ensure an undisturbed mechanical load path for the inner lateral mount for a lateral fixation of the aircraft engine and especially on how to provide a weight efficient lateral fixation of an engine whilst ensuring fire-proofness capability as well as to allow an easy dismountability of the firewalls for maintenance and access to the tail rotor shaft without the need to uninstall the main engine fixations. The documents EP4071046A1, US2018126199A1 and U.S. Pat. No. 10,669,038B2 are known.

SUMMARY

It is, therefore, an object of the present disclosure to provide a new rotary wing aircraft with a fuselage that forms an aircraft interior region, the fuselage comprising an upper primary skin that separates the aircraft interior region from an aircraft upper deck arranged above the fuselage, the upper primary skin being mounted on top of a predetermined number of supporting beams, wherein the aircraft upper deck comprises a first engine compartment at a starboard side and a second engine compartment arranged at a port side, a tail rotor drive shaft that is arranged between the engine compartments, and a firewall arrangement that defines fire proof separations among the two engine compartments, the tail rotor drive shaft, and the upper primary skin, and wherein the engines are mounted to the engine compartments by means of fixations that are at least suitable to ensure an undisturbed mechanical load path between lateral engine fixations and the primary structure of the aircraft, to satisfy the maintenance requirements of the tail rotor drive shaft, and to be suitable in the presence of an interposed lower firewall. This object is solved by a rotary wing aircraft.

More specifically, according to the present disclosure a rotary wing aircraft is provided with a fuselage that forms an aircraft interior region, the fuselage comprising an upper primary skin that separates the aircraft interior region from an aircraft upper deck arranged above the fuselage, the upper primary skin being mounted on top of a predetermined number of supporting beams. The aircraft upper deck comprises a first engine compartment arranged at a starboard side of the rotary wing aircraft, a second engine compartment arranged at a port side of the rotary wing aircraft, a tail rotor drive shaft that is arranged between the first and second engine compartments, a first firewall that separates the tail rotor drive shaft from the first and second engine compartments, a second firewall that separates the first and second engine compartments from each other, a third firewall that separates the first and second engine compartments from the upper primary skin, and a central bracket rigidly attached to the upper primary skin below the tail rotor drive shaft. The central bracket provides a first central bracket lug in the first engine compartment above the third firewall and a second central bracket lug in the second engine compartment above the third firewall. The first, second, and third firewalls define fire proof separations between the first and second engine compartments and the tail rotor drive shaft, between the first and second engine compartments, and between the first and second engine compartments and the upper primary skin, respectively. The first engine compartment comprises a first rear mount, a first outboard fixation, and a first inboard fixation that are adapted for receiving a first aircraft engine. The second engine compartment comprises a second rear mount, a second outboard fixation, and a second inboard fixation that are adapted for receiving a second aircraft engine. The first inboard fixation comprises a first inner main mounting bracket adapted for being rigidly attached to the first aircraft engine, a first inboard main mount that attaches the first inner main mounting bracket with a first beam web of at least one first beam of the predetermined number of supporting beams, and a first inboard lateral mount that attaches the first inner main mounting bracket with the first central bracket lug. The second inboard fixation comprises a second inner main mounting bracket adapted for being rigidly attached to the second aircraft engine, a second inboard main mount that attaches the second inner main mounting bracket with a second beam web of at least one second beam of the predetermined number of supporting beams, and a second inboard lateral mount that attaches the second inner main mounting bracket with the second central bracket lug.

Illustratively, in the rotary wing aircraft, an advantageous arrangement of structural fittings attaching a lateral strut to the primary structure of the aircraft and the engine is provided. More specifically, an overall engine attachment for one engine includes a rear mount, an outboard fixation, and an inboard fixation. Both the outboard and inboard fixations may have one main fixation. The inboard fixation advantageously has an inboard lateral mount to the engine such that the fixation principle offers a clear and explicit transfer of the components of the loads excited by the engine, which are essentially inertia loads for the most sizing flight and landing load cases including emergency landing.

By way of example, a main fixation may be defined by a main fixation item for the engine and two main fixation items for the airframe. The main fixation item for the engine may be an engine fitting main lug with a main engine fixation point. The two main fixation items for the airframe may have two main airframe fixation points. The main engine fixation point(s) may be illustratively formed at an inner main mounting bracket of an inboard fixation and/or an outer main mounting bracket of an outboard fixation. The three fixation points of the main fixation may be interconnected by a main pendulum mount which has a main vertical working plane with a main vertical mount axis within the main vertical working plane. The fixation points of the pendulum mount may have main bolts oriented perpendicular to the main vertical working plane and mainly transfer longitudinal and vertical loads of the engine to the airframe.

Preferably, the inboard lateral mount is provided to mainly transfer a lateral load of the engine to the airframe. More specifically, the inboard lateral mount can include a lateral strut which interconnects a lateral engine fixation item to one lateral airframe fixation item. The lateral engine fixation item may be allocated on an inboard engine fitting lateral lug and the one lateral airframe fixation item may be allocated on an inboard central bracket lug.

Illustratively, the corresponding lateral airframe fixation points are allocated on the corresponding central bracket lugs provided by the central bracket. Distal fixations of the lateral strut may be provided by means of lateral bolts which are oriented essentially perpendicular to the main bolts attaching the main pendulum mount, and hence essentially in the longitudinal direction.

Furthermore, the inboard engine fitting lateral lug and the inboard engine fitting main lug may both be incorporated in the inner main mounting bracket and close to each other. Illustratively, the lateral engine fixation point may join or be close to the main engine fixation point at the inner main mounting bracket. As such, the inner main mounting bracket may combine the inboard engine fitting main lug with an associated main bolt and the inboard engine fitting lateral lug with associated lateral bolts. Preferably, the main mounting bracket may be attached to the engine housing at a single inboard engine attachment by means of detachable fasteners.

Advantageously, the grouped arrangement of the main engine inboard fixation and the lateral engine fixation in an inboard fixation with a single inboard engine fitting that closely groups the main engine fixation item and the lateral engine fixation item enables to simplify and minimize the number of interfaces on the engine housing and reduce the consumed design space.

Preferably, the main vertical mount axis and the axis of the lateral strut intersect each other at a first intersection point, which is allocated close to the single inboard engine attachment and close to the centroid of the fasteners fixing the inner main mounting bracket to the engine at the single inboard engine attachment. More specifically, the centroid of the fastener group is defined by the total elastic center of the screwed joint and is allocated within the perimeter covered by the screwed field. For equal and equidistant: fasteners, the centroid thereof is allocated in the geometric center of the fixation. Such arrangement would minimize parasitic moments, achieve a better distributed total interface load between the fasteners, and reduce the loads on the fasteners.

According to the present disclosure, a second intersection point is advantageously provided. The allocation of the second intersection point is defined by an intersection of the extended axis of both lateral struts, namely the strut for the starboard side engine and the strut for the port side engine. More specifically, the second intersection point is allocated on the engine deck close to the engine deck skin below the tail rotor drive shaft.

More specifically, the lateral inertia load of the engine is split within the first intersection point into two load components: one being directly transferred to the main mount along the main mount axis and one being directly transferred to the lateral strut in the strut axis direction. The strut load component is further being transferred into the central bracket following the load path defined by the strut axis and reaches the second intersection point.

Since the inertia load factors apply simultaneously on both engines, the strut load components are equal in magnitude. As a result, the vertical load components of both strut load advantageously cancel each other-due to opposite directions-within the second intersection point. The resultant load that is transferred into the primary structure may be mainly a resultant horizontal load. As the second intersection point is close to the engine deck skin, the horizontal resultant load may be directly reacted at the horizontal skin of the engine deck, hence eliminating secondary bending loads.

The central bracket that receives the strut load components from each of both engines and collects them within the second intersection point may preferably be an integral part. More specifically, the central bracket may cover the direct load paths between the lateral engine fixation items of the starboard side and port side of the aircraft and the second intersection point. That is, the central bracket may be designed following the trajectory of the axis of both lateral struts.

Illustratively, the central bracket provides central bracket lugs for receiving lateral airframe fixation ends of the lateral struts. The central bracket may comprise a main body incorporating the central bracket lugs which receives the lateral airframe fixation ends of the lateral struts by means of lateral bolts. The lateral bolts may preferably be oriented in a similar way as the lateral bolts on the lateral engine fixation item.

Furthermore, the main body of the central bracket may preferably have a bracket foot which is riveted to the engine deck skin. More specifically, the main body of the central bracket may incorporate a central bracket web close to the second intersection point. The central bracket web preferably trespasses the engine deck skin and is riveted to a beam web of a stiffening member, such as an intercostal, arranged below the engine deck. The central bracket web may advantageously transmit a residual amount of vertical load for load cases with strut loads unequal in magnitude. Thus, tensile loads on the fasteners connecting the foot of the central bracket to the deck skin may be avoided.

Moreover, the main body of the central bracket may be essentially accommodated underneath the tail rotor drive shaft such that all primary structural fixed member may preferably be arranged underneath the tail rotor drive shaft.

Such arrangement may enable the removal of a non-structural central firewall without impacting the engine fixations.

More specifically, the central firewall may be split into a lower portion and an upper portion. The lower portion of the central firewall may incorporate a tunnel housing the tail rotor drive shaft. For inspection and maintenance of the tail rotor drive shaft, the upper portion of the central firewall can be detached from the lower portion and be removed. The central bracket may be riveted to the lower portion of the central firewall.

Furthermore, the central bracket may be attached to a support rib close to the central bracket lug. The support rib may be installed on top of the engine deck below the bottom firewall.

A lateral stabilization of the central bracket may be advantageously accomplished by its attachment to the lower portion of the center firewall and its attachment to the support rib above the engine deck. Besides providing lateral support for the main bracket that extends from the support beam to the upper side of the bottom firewall, the support rib may also bridge the isolating gap therebetween.

The bottom firewall is illustratively arranged between the engine and the engine deck. The central bracket lugs may protrude through the bottom firewall such that the central bracket extends partially below the bottom firewall and between the central firewall. Furthermore, the central bracket may incorporate plateaus for holding the bottom firewall and for sealing any gaps remaining after the central bracket lugs pass through cut-outs on the bottom firewall.

According to some embodiments, the central bracket comprises a base that is rigidly attached to the upper primary skin.

According to some embodiments, the central bracket further comprises first and second firewall attachments that are rigidly attached to the first firewall.

According to some embodiments, the central bracket further comprises a central bracket web that extends below the upper primary skin and that is rigidly attached to a third beam web of at least one third beam of the predetermined number of supporting beams.

According to some embodiments, the first inboard lateral mount comprises a first strut that is rotatably mounted to the first central bracket lug via a first spherical bearing.

Preferably, the second inboard lateral mount comprises a second strut that is rotatably mounted to the second central bracket lug via a second spherical bearing.

According to some embodiments, the first strut is further rotatably mounted to the first inner main mounting bracket via a third spherical bearing.

Preferably, the second strut is further rotatably mounted to the second inner main mounting bracket via a fourth spherical bearing.

According to some embodiments, a first axis through the first and third spherical bearings and a second axis through the second and fourth spherical bearings intersect at the upper primary skin below the tail rotor drive shaft.

According to some embodiments, the first axis forms a first angle with the upper primary skin, wherein the second axis forms a second angle with the upper primary skin.

Preferably, the first angle and the second angle have a same value.

According to some embodiments, the first angle is between 25° and 55°. If desired, the second angle is preferably between 25° and 55°.

According to some embodiments, the rotary wing aircraft further comprises first and second support ribs that are located between the upper primary skin and the third firewall, respectively.

Preferably, the first and second support ribs are rigidly attached to the upper primary skin.

According to some embodiments, the central bracket further comprises a first rib attachment that is rigidly attached to the first support rib, and a second rib attachment that is rigidly attached to the second support rib.

According to some embodiments, the first inboard main mount comprises a first inner main mount bracket with a first main mount web that is rigidly attached to the first support rib. Preferably, the second inboard main mount comprises a second inner main mount bracket with a second main mount web that is rigidly attached to the second support rib.

According to some embodiments, the first inboard main mount comprises a first inner main mount that is rotatably mounted to the first inner main mounting bracket. Preferably, the second inboard main mount comprises a second inner main mount that is rotatably mounted to the second inner main mounting bracket.

According to some embodiments, the first inner main mount bracket extends through the third firewall and comprises first and second main mount lugs. Preferably, the second inner main mount bracket extends through the third firewall and comprises third and fourth main mount lugs.

According to some embodiments, the first inner main mount is attached to the first and second main mount lugs. Preferably, the second inner main mount is attached to the third and fourth main mount lugs.

BRIEF DESCRIPTION OF DRAWINGS

Preferred embodiments of the disclosure are outlined by way of example in the following description with reference to the attached drawings. In these attached drawings, identical or identically functioning components and elements are labeled with identical reference numbers and characters and are, consequently, only described once in the following description.

DETAILED DESCRIPTION

Figure 1:
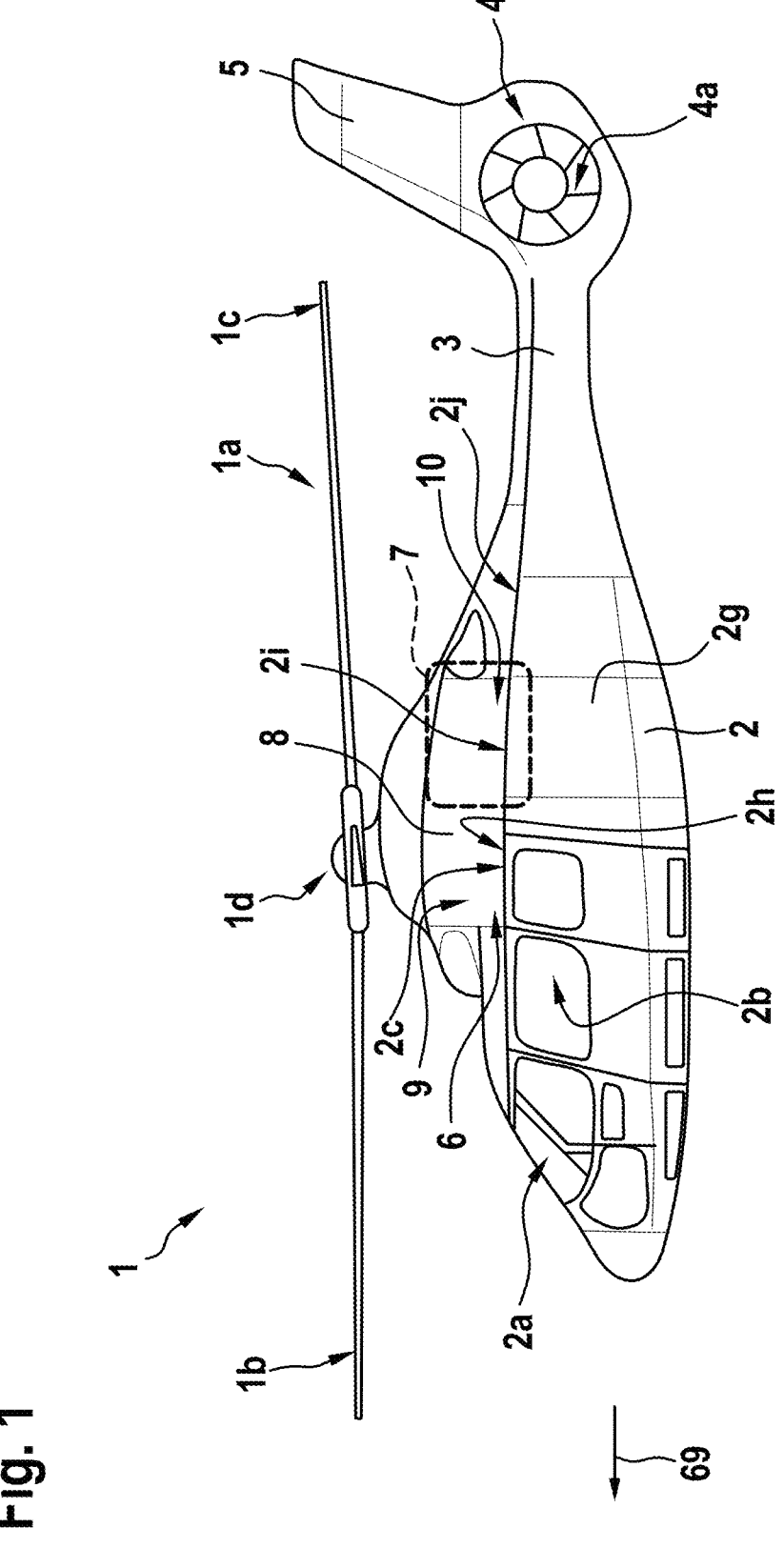
FIG. 1 shows a lateral view of a rotary wing aircraft with an illustrative engine accommodating region according to the disclosure, which is covered by a cowling.

FIG. 1 shows a rotary wing aircraft 1 with a longitudinal axis 69, which is exemplarily illustrated as a helicopter. Thus, for purposes of simplicity and clarity, the rotary wing aircraft 1 is hereinafter referred to as the "helicopter 1". The present disclosure is, however, not limited to helicopters and can likewise be applied to any other vehicle, in particular to vehicles wherein fluids, especially flammable fluids, must be canalized in specific situations towards one or more associated drainage points.

Preferably, the helicopter 1 comprises at least one multi-blade main rotor 1a for providing lift and forward or backward thrust during operation. The at least one multi-blade main rotor 1a preferentially comprises a plurality of rotor blades 1b, 1c that are mounted at an associated rotor head 1d to a rotor shaft, which rotates in operation of the helicopter 1 around an associated rotor axis.

Illustratively, the helicopter 1 comprises a fuselage 2 that forms an aircraft interior region 2a, 2b. The aircraft interior region 2a, 2b preferably accommodates at least a cockpit 2a and may further accommodate a cabin 2b for passengers and/or cargo. By way of example, a tail boom 3 is connected to the fuselage 2 of the helicopter 1.

The helicopter 1 illustratively further comprises at least one preferentially shrouded counter-torque device 4 configured to provide counter-torque during operation, i.e., to counter the torque created by rotation of the at least one multi-blade main rotor 1a for purposes of balancing the helicopter 1 in terms of yaw. The at least one counter-torque device 4 is illustratively provided at an aft section of the tail boom 3 and preferably comprises a tail rotor 4a. The aft section of the tail boom 3 preferably further comprises a fin 5.

According to one aspect, the fuselage 2 comprises an upper primary skin 2c that separates the aircraft interior region 2a, 2b from an aircraft upper deck 6 arranged above the fuselage 2. In other words, the upper primary skin 2c forms an upper end of the fuselage 2.

Illustratively, the upper primary skin 2c includes a front deck skin 2h, an engine deck skin 2i, and a rear deck skin 2j. The front deck skin 2h is associated with a main gear box compartment 9 and the engine deck skin 2i is associated with an engine deck, both of which are part of the aircraft upper deck 6. The engine deck illustratively forms an engine accommodating region 7 with a firewall arrangement 10. Preferably, the aircraft upper deck 6 and, more particularly, at least the engine deck is covered by a cowling 8 that is mounted on top of the fuselage 2.

Preferably, the fuselage 2 includes side shells 2g which illustratively encase the aircraft interior region 2a, 2b and which are mounted to interconnected frames and longitudinal beams to form a primary structure of the helicopter 1 that is designed and adapted for global and local load carrying duties. Thus, the fuselage's upper primary skin 2c is also involved in these global load carrying duties and, consequently, contributes to global load carrying of the fuselage 2.

Figure 2:
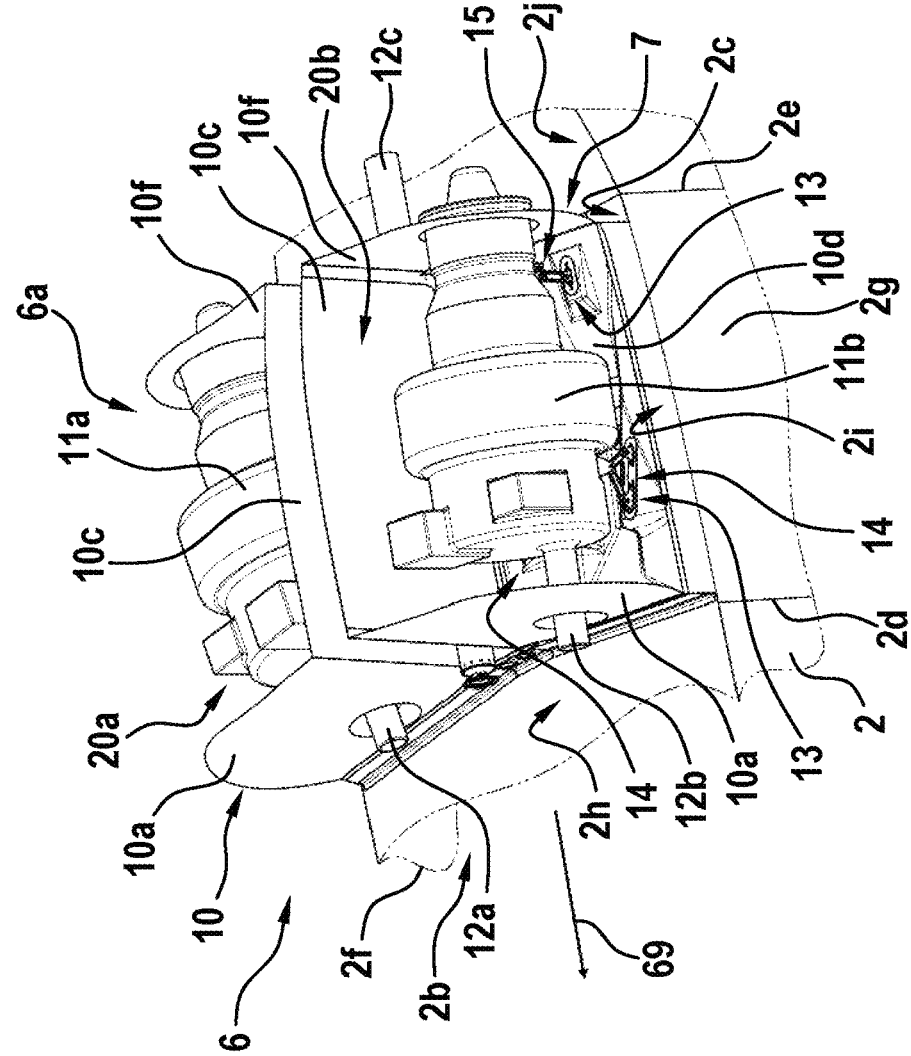
FIG. 2 shows a perspective view of the illustrative engine accommodating region of FIG. 1 without the cowling.

FIG. 2 shows the engine deck 6a of FIG. 1 which is part of the aircraft upper deck 6 of the helicopter 1 of FIG. 1 and that forms the engine accommodating region 7 with the firewall arrangement 10. The engine deck 6a is arranged above the fuselage 2 of FIG. 1, which includes by way of example the side shell 2g and a further side shell 2f, which encompass the aircraft interior region 2b. Both side shells 2f, 2g are at least mounted to first and second frames 2d, 2e of the fuselage 2, which are associated with the engine deck 6a and, therefore, also referred to as the "front frame 2d" and the "rear frame 2e", for simplicity and clarity. By way of example, the front and rear frames 2d, 2e delimit the engine deck 6a, i.e., the engine accommodating region 7, in the longitudinal direction along the longitudinal axis 69 of the helicopter 1 of FIG. 1.

According to one aspect, the engine accommodating region 7 accommodates at least one aircraft engine within the firewall arrangement 10 such that the firewall arrangement 10 defines a fire proof separation at least between the at least one aircraft engine and the aircraft interior region 2b.

More generally, the firewall arrangement 10 preferably defines a fire proof separation between the at least one aircraft engine and other adjacent aircraft regions. Such other adjacent aircraft regions include the aircraft interior region 2b, as well as e.g., an engine compartment of a further aircraft engine, and forward and aft regions to the engine accommodating region 7, such as e.g., gear box or exhaust accommodating regions.

Illustratively, the engine accommodating region 7 accommodates two aircraft engines 11a, 11b within the firewall arrangement 10. Each aircraft engine 11a, 11b is preferably arranged in an associated engine compartment 20a, 20b. By way of example, two adjacent engine compartments 20a, 20b are provided. More specifically, the aircraft upper deck 6 comprises a first engine compartment 20a arranged at a starboard side of the helicopter 1, a second engine compartment 20b arranged at a port side of the helicopter 1, and a tail rotor drive shaft 12c that is arranged between the first and second engine compartments 20a, 20b.

Preferably, the two aircraft engines 11a, 11b are embodied as air breathing propulsion gas turbines, which combust a fuel/air mix for power generation. Illustratively, each aircraft engine 11a, 11b has an associated drive shaft 12a, 12b, e.g., for driving an associated main gear box of the helicopter 1 of FIG. 1.

According to one aspect, the two aircraft engines 11a, 11b and, thus, the two adjacent engine compartments 20a, 20b may be separated from each other by means of two mid firewalls 10c of the firewall arrangement 10. The mid firewalls 10c preferably form a gap that embodies a drive shaft channel for a tail rotor drive shaft 12c.

If desired, the firewall arrangement 10 may further include for each one of the two adjacent engine compartments 20a, 20b at least a front firewall 10a and a rear firewall 10f. Preferably, each one of the front firewall 10a, the rear firewall 10f, and the mid firewall 10c of each one of the two adjacent engine compartments 20a, 20b comprises a fire proof material, including at least one of titanium, steel, ceramics, a polymeric composite, or a hybrid organic-inorganic composite. In one realization, at least one of the front firewall 10a, the rear firewall 10f, or the mid firewall 10c has a titanium skin with a minimum thickness of 0.4 mm, preferably with a thickness in a range from 0.6 mm to 0.8 mm.

Moreover, for each one of the two adjacent engine compartments 20a, 20b the firewall arrangement 10 preferably comprises in addition to the front firewall 10a, the rear firewall 10f, and the mid firewall 10c a lower firewall 10d, which may be funnel-shaped, that is arranged between the aircraft engine 11b and the upper primary skin 2c of the fuselage 2. In FIG. 2, however, only the lower firewall 10d for the engine compartment 20b is visible.

Preferably, the two adjacent engine compartments 20a, 20b and the firewall arrangement 10 of each one of the two adjacent engine compartments 20a, 20b are embodied with similar components. Therefore, with respect to FIG. 2, only the engine compartment 20b and the firewall arrangement 10 of the engine compartment 20b are representatively described in more detail.

By way of example, the front firewall 10a and the rear firewall 10f delimit the associated engine compartment 20b in the longitudinal direction along the longitudinal axis 69, and the lower firewall 10d forms a bottom of the engine compartment 20b therebetween. Preferably, the aircraft engine 11b is mounted to engine attachments 13 provided in the engine compartment 20b. More specifically, engine attachments 13 may include at least one front attachment 14, which is positioned along the longitudinal axis 69 on a front section of the lower firewall 10*d*, and at least one rear attachment 15, which is positioned along the longitudinal axis 69 on a rear section of the lower firewall 10*d*. Two front attachments 14 may be utilized and arranged, in a preferred embodiment, approximately symmetrically with respect to the aircraft engine drive shaft 12*b* on the transverse sides of the aircraft engine 11*b*, and one rear attachment 15 is arranged approximately on the axis of the aircraft engine drive shaft 12*b*. Thus, a stable triangular support structure is formed for the aircraft engine 11*b* and a triangular mounting plane may be realized by such triangular support structure.

Moreover, each of the front attachments 14 may attach to the aircraft engine 11*b* via a front fixation point, and the rear attachment 15 may attach to the aircraft engine 11*b* via a rear fixation point. In FIG. 2, however, only one of the front fixation points, an outer main fixation point of the front attachment 14 is visible.

Figure 3:
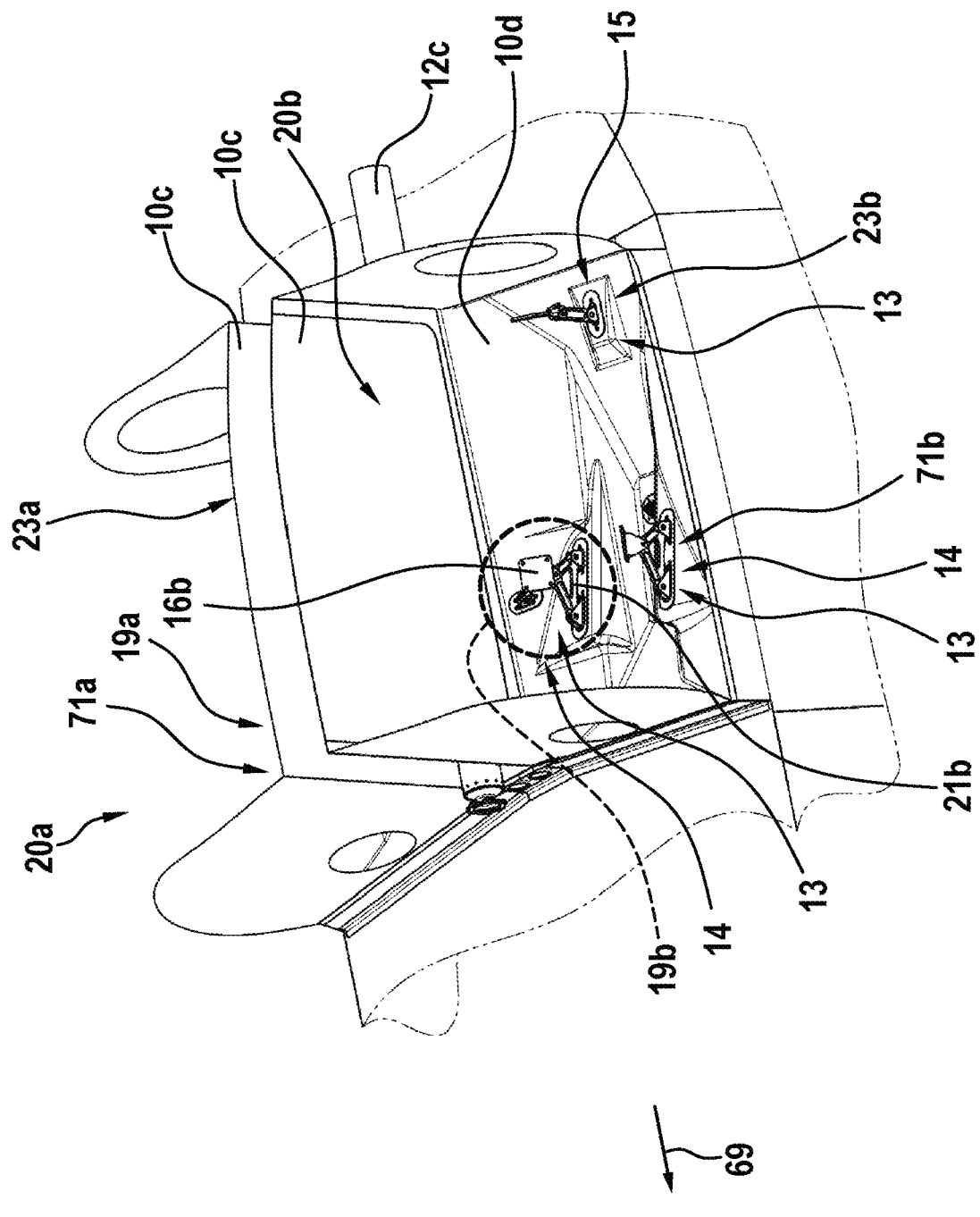
FIG. 3 shows a perspective view of the illustrative engine accommodating region of FIG. 2 without engines.

FIG. 3 shows the engine deck 6*a* within the aircraft upper deck 6 of FIG. 2, the aircraft engines 11*a*, 11*b* are omitted in FIG. 3 to show engine attachments 13 including the two front attachments 14 and the rear attachment 15 allocated within the engine compartments 20*a*, 20*b*.

More specifically, the first engine compartment 20*a* comprises a first rear mount 23*a*, a first outboard fixation 71*a*, and a first inboard fixation 19*a* that are adapted for receiving a first aircraft engine. Likewise, the second engine compartment 20*b* comprises a second rear mount 23*b*, a second outboard fixation 71*b*, and a second inboard fixation 19*b* that are adapted for receiving a second aircraft engine. In FIG. 3, however, only the engine attachments 13 in the second engine compartment 20*b* are visible in more detail. Therefore, hereinafter only the second rear mount 23*b*, the second outboard fixation 71*b*, and the second inboard fixation 19*b* in the second engine compartment 20*b* are representatively described in more detail.

Illustratively, the front attachments 14 of the second engine compartment 20*b* include the outboard fixation 71*b* and the inboard fixation 19*b*. The outboard fixation 71*b* is positioned away from the mid firewall 10*c* and the inboard fixation 19*b* is positioned near the mid firewall 10*c*. Preferably, the outboard fixation 71*b* may consist of an outer main mounting bracket, an outer main mount, and an outer main mount fixation. The inboard fixation 19*b* may comprise an inner main fixation point that is similar to the outboard fixation 71*b*. The inner main fixation point may preferably consist of an inner main mounting bracket 16*b*, an inner main mount 21*b*, and an inner main mount fixation. By way of example, the inner main mount 21*b* of the inboard fixation 19*b* is received by main mount lugs 62*b*.

More specifically, the outer main mount fixation is preferably connected to the outer main mount that is attached to the aircraft engine, and the inner main mount fixation is preferably connected to the inner main mount 21*b* that is attached to the aircraft engine. By way of example, the outer main mount is rotatably mounted to the outer mounting bracket that is rigidly attached to the aircraft engine, and the inner main mount 21*b* is rotatably mounted to the inner mounting bracket 16*b* that is rigidly attached to the aircraft engine.

Figure 4:
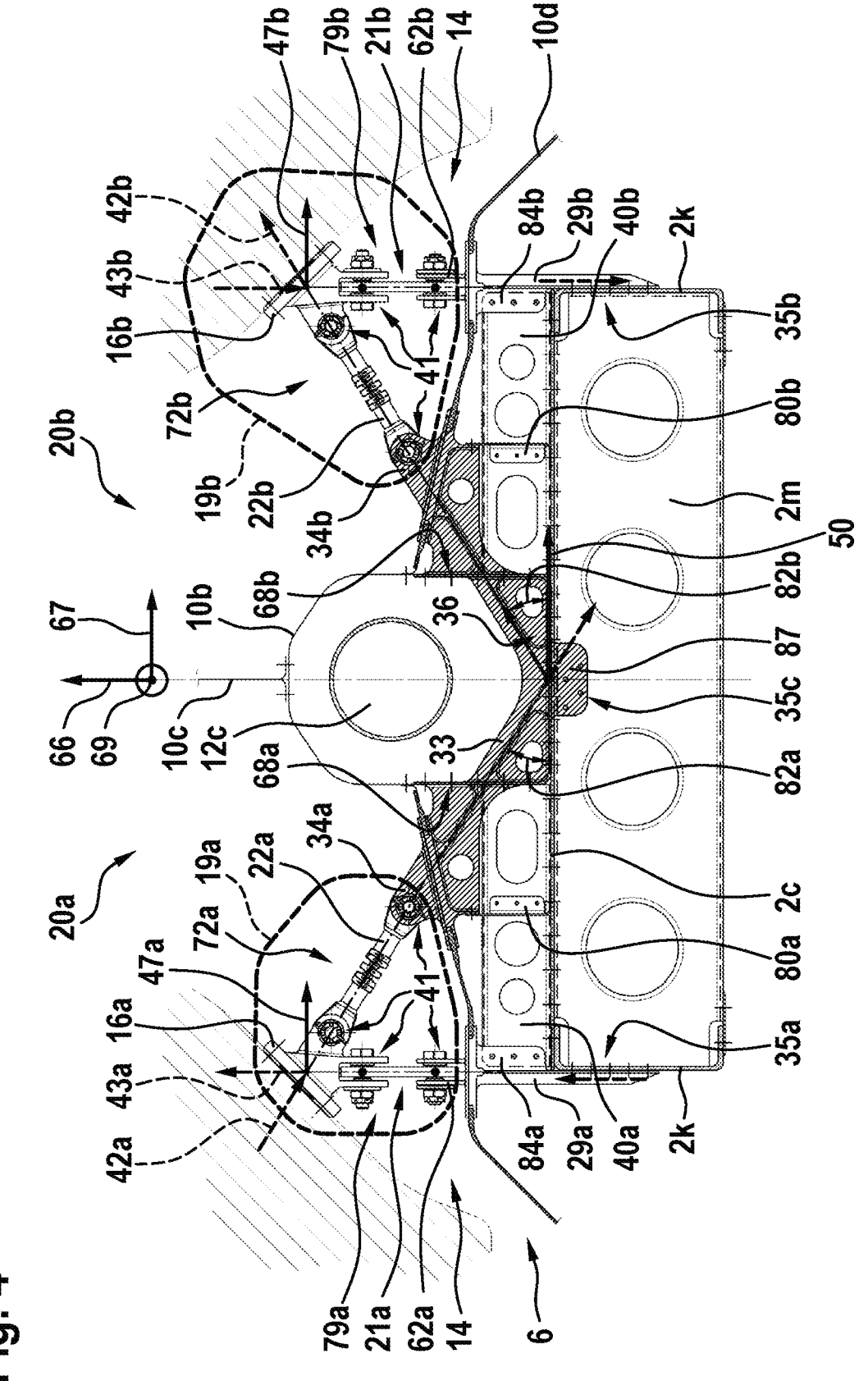
FIG. 4 shows a partially front view of the illustrative engine accommodating region of FIG. 1 to illustrate an and firewalls in the engine arrangement of a central bracket accommodating region.

FIG. 4 shows a partially view of the aircraft upper deck 6 from the front along the longitudinal axis 69 at front attachments 14 between the first inboard fixation 19*a* of the first engine compartment 20*a* and the second inboard fixation 19*b* of the second engine compartment 20*b*. The upper primary skin 2*c* that separates the aircraft interior region 2*a*, 2*b* of FIG. 1 from the aircraft upper deck 6 is mounted on top of a predetermined number of supporting beams including longitudinal beams 2*k* and transversal beams 2*m*.

The aircraft upper deck 6 comprises a first firewall 10*b*, a second firewall, and a third firewall. The first firewall 10*b* separates the tail rotor drive shaft 12*c* from the first and second engine compartments 20*a*, 20*b*. By way of example, the first firewall 10*b* may surround the tail rotor drive shaft 12*c*. If desired, the first firewall 10*b* may be illustratively composed of a lower portion and an upper portion. The upper portion of the first firewall 10*b* is allocated above a central bracket 33 and is partially shaped as a tunnel covering the tail rotor drive shaft 12*c*.

The second firewall separates the first and second engine compartments 20*a*, 20*b* from each other. As such, the second firewall may be exemplarily illustrated as the mid firewall 10*c*. The third firewall separates the first and second engine compartments 20*a*, 20*b* from the upper primary skin 2*c*. As such, the third firewall may be exemplarily illustrated as the lower firewall 10*d*.

The first, second, and third firewalls 10*b*, 10*c*, 10*d* define fire proof separations between the first and second engine compartments 20*a*, 20*b* and the tail rotor drive shaft 12*c*, between the first and second engine compartments 20*a*, 20*b*, and between the first and second engine compartments 20*a*, 20*b* and the upper primary skin 2*c*, respectively.

The aircraft upper deck 6 further includes a central bracket 33 that is rigidly attached to the upper primary skin 2*c* below the tail rotor drive shaft 12*c*. The central bracket 33 provides a first central bracket lug 34*a* in the first engine compartment 20*a* above the third firewall 10*d*. More specifically, the first central bracket lug 34*a* may be provided for supporting the first inboard fixation 19*a* that is adapted for receiving the first aircraft engine, which is represented by the upper left hatched area in FIG. 4.

The first inboard fixation 19*a* comprises a first inner main mounting bracket 16*a*, a first inboard main mount 79*a*, and a first inboard lateral mount 72*a*. The first inner main mounting bracket 16*a* is adapted for being rigidly attached to the first aircraft engine. The first inboard main mount 79*a* attaches the first inner main mounting bracket 16*a* with a first beam web 35*a* of at least one first beam 2*k* of the predetermined number of supporting beams 2*k*. The first inboard lateral mount 72*a* attaches the first inner main mounting bracket 16*a* with the first central bracket lug 34*a*.

Furthermore, the central bracket 33 provides a second central bracket lug 34*b* in the second engine compartment 20*b* above the third firewall 10*d*. More specifically, the second central bracket lug 34*b* is provided for supporting the second inboard fixation 19*b* that is adapted for receiving the second aircraft engine, which is represented by the upper right hatched area in FIG. 4.

The second inboard fixation 19*b* comprises the second inner main mounting bracket 16*b*, a second inboard main mount 79*b*, and a second inboard lateral mount 72*b*. The second inner main mounting bracket 16*b* is adapted for being rigidly attached to the second aircraft engine. The second inboard main mount 79*b* attaches the second inner main mounting bracket 16*b* with a second beam web 35*b* of at least one second beam 2*k* of the predetermined number of supporting beams 2*k*. The second inboard lateral mount 72*b* attaches the second inner main mounting bracket 16*b* with the second central bracket lug 34*b*.

Preferably, the first inboard main mount 79*a* comprises a first inner main mount 21*a* that is rotatably mounted to the first inner main mounting bracket 16*a*. The first inner main mount 21*a* shows a first main mount axis 43*a* through the main engine fixation point at the first inner main mounting bracket 16a and the main airframe fixation point at the main mount lugs, e.g., first and second main mount lugs 62a. The first main mount axis 43a is essentially oriented parallel to vertical axis 66. If desired, the first main mount axis 43a may intersect a strut axis to form an intersection point at the first inner main mounting bracket 16a.

Illustratively, the first inboard main mount 79a can include a first inner main mount bracket 29a. As shown in FIG. 4, the first inner main mount bracket 29a extends through the third firewall 10d and comprises the first and second main mount lugs 62a. By way of example, the first inner main mount 21a is attached to the first and second main mount lugs 62a.

Likewise, the second inboard main mount 79b can include a second inner main mount 21b that is rotatably mounted to the second inner main mounting bracket 16b. The second inner main mount 21b shows a second main mount axis 43b which goes through the main engine fixation point at the second inner main mounting bracket 16b and the main airframe fixation point at the main mount lugs, e.g., third and fourth main mount lugs 62b. The second main mount axis 43b is also essentially oriented parallel to vertical axis 66. If desired, the second main mount axis 43b may intersect a strut axis to form an intersection point at the second inner main mounting bracket 16b.

The second inboard main mount 79b can include a second inner main mount bracket 29b. The second inner main mount bracket 29b extends through the third firewall 10d and comprises the third and fourth main mount lugs 62b. By way of example, the second inner main mount 21b is attached to the third and fourth main mount lugs 62b.

Illustratively, the helicopter 1 includes first and second support ribs 40a, 40b. The first and second support ribs 40a, 40b are located between the upper primary skin 2c and the third firewall 10d, respectively, at the first and second engine compartments 20a, 20b. In some implementations, the first and second support ribs 40a, 40b are rigidly attached to the upper primary skin 2c.

By way of example, the first inboard main mount 79a includes the first inner main mount bracket 29a with a first main mount web 84a that is rigidly attached to the first support rib 40a. Likewise, the second inboard main mount 79b includes the second inner main mount bracket 29b with a second main mount web 84b that is rigidly attached to the second support rib 40b.

As shown in FIG. 4, the central bracket 33 may include a first rib attachment 80a that is rigidly attached to the first support rib 40a, and a second rib attachment 80b that is rigidly attached to the second support rib 40b. Illustratively, the first and second support ribs 40a, 40b may extend towards an attachment point of the central bracket 33 with the upper primary skin 2c.

By way of example, the central bracket 33 may include a base 36 that is rigidly attached to the upper primary skin 2c. The base 36 is illustratively allocated at a lower part of the first firewall 10b. The central bracket 33 may comprise first and second firewall attachments 68a, 68b that are rigidly attached to the first firewall 10b, if desired.

Illustratively, the central bracket 33 may include a central bracket web 87. As shown in FIG. 4, the central bracket web 87 extends below the upper primary skin 2c. If desired, the central bracket web 87 may be rigidly attached to a third beam web 35c of at least one third beam 2k of the predetermined number of supporting beams 2k.

As shown in FIG. 4, the central bracket 33 may extend along two angled lateral axes 42a, 42b from the central bracket web 87, thereby connecting the base 36 with the first and second firewall attachments 68a, 68b and the first and second central bracket lugs 34a, 34b. Illustratively, the first and second central bracket lugs 34a, 34b may respectively receive first and second lateral struts 22a, 22b, respectively.

As shown in FIG. 4, the first inboard lateral mount 72a comprises a first strut 22a and the second inboard lateral mount 72b comprises a second strut 22b. By way of example, the first strut 22a may be rotatably mounted to the first central bracket lug 34a via a first spherical bearing 41, and the second strut 22b may be rotatably mounted to the second central bracket lug 34b via a second spherical bearing 41.

The first strut 22a may be rotatably mounted to the first inner main mounting bracket 16a via a third spherical bearing 41, and the second strut 22b may be rotatably mounted to the second inner main mounting bracket 16b via a fourth spherical bearing 41. If desired, flanged bushes for accommodating each of the spherical bearings 41 may be provided.

Illustratively, a first axis 42a through the first and third spherical bearings 41 and a second axis 42b through the second and fourth spherical bearings 41 intersect at the upper primary skin 2c below the tail rotor drive shaft 12c. In particular, the first axis 42a forms a first angle 82a with the upper primary skin 2c, which is preferably arranged parallel to the lateral axis 67. Illustratively, the first angle is between 25° and 55°. The second axis 42b forms a second angle 82b with the upper primary skin 2c. If desired, the first angle 82a and the second angle 82b may have a same value. Preferably, the second angle 82b is between 25° and 55°.

The central bracket 33 is designed to cover the load paths from both lateral struts 22a, 22b, which are defined by the corresponding first and second axes 42a, 42b. The lateral inertia loads 47a, 47b of the engines act in the same direction with the same magnitude since the accelerations related to the inertia loads act simultaneously on both engines. The first and second lateral inertial loads 47a, 47b are split into first and second strut load components along axes 42a, 42b and first and second main pendulum mount components along axes 43a, 43b. The first and second strut load components are transferred into the central bracket 33 following the axes 42a, 42b, and the first and second main pendulum mount components are transferred into the beam 2k following the axes 43a, 43b. At the intersection point of axes 42a, 42b both strut load components superpose, and the opposed vertical components along vertical axis 66 cancel each other. As a result, a load 50 acts in lateral direction parallel to lateral axis 67 which is directly transferred by the base 36 of the central bracket 33 into the upper deck skin 2c.

Illustratively, support structures for receiving the respective aircraft engine are provided at the first inner main mounting bracket 16a of the first inboard fixation 19a and at the second inner main mounting bracket 16b of the second inboard fixation 19b. The support structures may have a triangular shape. However, the support structures may have any other shape, if desired. For example, the support structures may have the shape of a rectangle, a hexagon, an octagon, or any other suitable shape.

By way of example, the first inboard main mount 79a of first inner main mount 21a receives an inboard engine fitting main lug of the first inner main mounting bracket 16a, and the first lateral strut 22a of the inboard lateral mount 72a receives an inboard engine fitting lateral lug of the first inner main mounting bracket 16a. The inboard engine fitting main lug and the inboard engine fitting lateral lug may be integral parts of a single first inner main mounting bracket 16a which may be attached to the engine at a single first inboard engine attachment. A similar arrangement may be provided at the second inboard fixation 19*b*.

Still using the inboard first fixation 19*a* as representative for both inboard fixations 19*a* and 19*b*, a first main bolt may attach the first inboard main mount 79*a* with the inboard engine fitting main lug of the first inner main mounting bracket 16*a*. The first main bolt is oriented perpendicular to vertical axis 66 and parallel to lateral axis 67. A first lateral bolt may attach the first lateral strut 22*a* with the inboard engine fitting lateral lug. The lateral bolt is oriented essentially perpendicular to the main bolt and parallel to the longitudinal axis 69. However, it should be noted that, the relative orientations between the main bolt and the lateral bolt rather reflect a tendency of orientations. Preferably, the main bolt and the lateral bolt form an angle that is in the range of 70° to 120°. Furthermore, the lateral bolt may form an angle with the longitudinal axis that is in a range of ±30°.

Illustratively, the first and second main mount lugs 62*a* may be located at a predetermined distance from the upper primary skin 2*c* to ensure an adequate thermal insulation between the lower firewall 10*d* and the aircraft upper deck 6. Preferably, a lateral stabilization of the first inner main mount 21*a* is provided by the fixation of the upper portion of the first inner main mount bracket 29*a* to the support rib 40*a*. The support rib 40*a* is preferably heat resistant and riveted to the upper primary skin 2*c* and the lower portion of the first firewall 10*b*. A similar arrangement may be provided at the second inboard fixation 19*b*.

Figure 5:
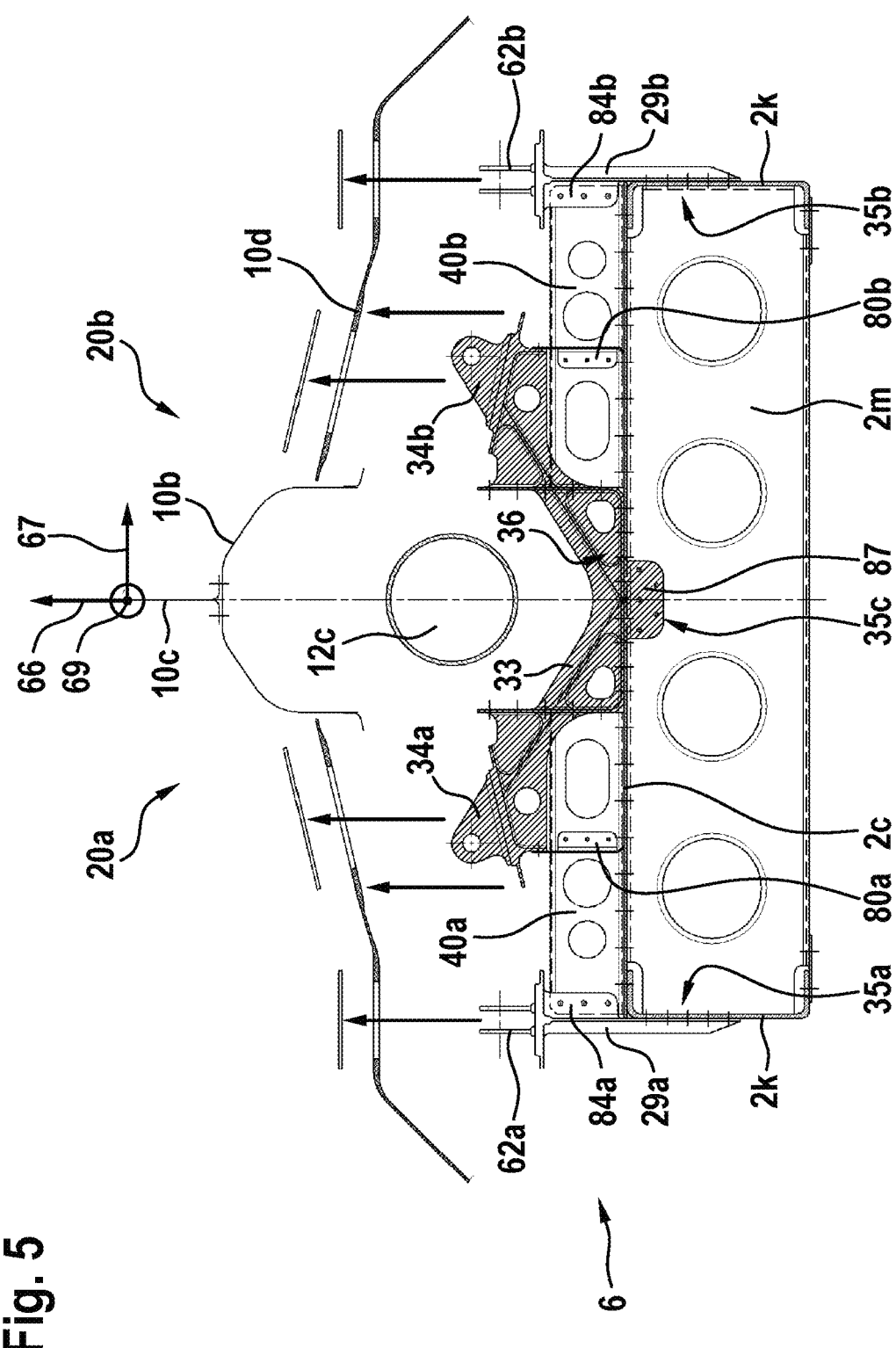
FIG. 5 shows a partially front view of the engine accommodating region of FIG. 4 with disassembled firewalls.

FIG. 5 shows an illustratively disassembly procedure to access the perimeter, e.g., the upper primary skin 2*c* below the third firewall 10*d* and to access the tail rotor drive shaft 12*c*.

More specifically, clamps that are applied at the cut-outs of the third firewall 10*d* for sealing any gaps around the lugs 34*a*, 34*b*, 62*a*, 62*b* may be removed. Then, the third firewall 10*d* may be upwardly removed to release the first firewall 10*b* so that the first firewall 10*b* may be removed to give access to the tail rotor drive shaft 12*c*. If desired, the second firewall 10*c* may be removed together with the first firewall 10*b*. As shown in FIG. 5, during and after dissembling the firewalls, the central bracket 33 and the inner main mount brackets 29*a*, 29*b* remain in place.

It should be noted that modifications to the above described embodiments are within the common knowledge of the person skilled in the art and, thus, also considered as being part of the present disclosure. It should further be noted that the drawings are only intended for schematically representing embodiments of the present disclosure and not for showing detailed constructions thereof.

For instance, the central bracket 33 may be alternatively installed without the use of a third firewall 10*d*. By way of example, the lugs 34*a*, 34*b*, 62*a*, 62*b* may be placed close to the upper primary skin 2*c*. The cut-outs of the third firewall 10*d* for lateral struts 22*a*, 22*b* to pass-through may be alternatively provided at the lower portion of the first firewall 10*b*. Such cut-outs of the first firewall 10*b* may be closed by tubular seals attached to the lateral strut 22*a*, 22*b*. The fire proofness of the engine deck 6*a* may be provided by fire resistant materials of the main structural items thereof.

REFERENCE LIST 1 rotary wing aircraft
1*a* multi-blade main rotor
1*b*, 1*c* rotor blades
1*d* rotor head 2 fuselage
2*a* cockpit
2*b* cabin
2*c* upper primary skin of fuselage
2*d* front frame of engine deck
2*e* rear frame of engine deck
2*f*, 2*g* fuselage side shells
2*h* front deck skin
2*i* engine deck skin
2*j* rear deck skin
2*k* longitudinal beams
2*m* transversal beams
3 tail boom
4 counter-torque device
4*a* tail rotor
5 fin
6 aircraft upper deck
6*a* engine deck
7 engine accommodating region
8 cowling
9 main gear box compartment
10 firewall arrangement
10*a* front firewall
10*b* first firewall
10*c* second firewall/mid firewall
10*d* third firewall/lower firewall
10*f* rear firewall
11*a*, 11*b* aircraft engines
12*a*, 12*b* aircraft engine drive shafts
12*c* tail rotor drive shaft
13 engine attachments
14 front attachments
15 rear attachment
16*a*, 16*b* inner main mounting bracket
19*a*, 19*b* inboard fixation
20*a*, 20*b* engine compartments
21*a*, 21*b* inner main mount
22*a*, 22*b* lateral strut
23*a*, 23*b* rear mount
29*a*, 29*b* inner main mount bracket
33 central bracket
34*a*, 34*b* central bracket lug
35*a*, 35*b*, 35*c* beam webs
36 base
40*a*, 40*b* support rib
41 spherical bearings
42*a*, 42*b* axis
43*a*, 43*b* axis
47*a*, 47*b* lateral inertia load
50 load
62*a*, 62*b* main mount lug
66 vertical axis
67 lateral axis
68*a*, 68*b* firewall attachments
69 longitudinal axis
71*a*, 71*b* outboard fixation
72*a*, 72*b* inboard lateral mount
79*a*, 79*b* inboard main mount
80*a*, 80*b* rib attachment
82*a*, 82*b* angle
84*a*, 84*b* main mount web
87 central bracket web

What is claimed is:

1. A rotary wing aircraft, with a fuselage that forms an aircraft interior region, the fuselage comprising an upper primary skin that separates the aircraft interior region from an aircraft upper deck arranged above the fuselage, the upper primary skin being mounted on top of a predetermined number of supporting beams; wherein the aircraft upper deck comprises a first engine compartment arranged at a starboard side of the rotary wing aircraft, a second engine compartment arranged at a port side of the rotary wing aircraft, a tail rotor drive shaft that is arranged between the first and second engine compartments, a first firewall that separates the tail rotor drive shaft from the first and second engine compartments, a second firewall that separates the first and second engine compartments from each other, a third firewall that separates the first and second engine compartments from the upper primary skin, and a central bracket rigidly attached to the upper primary skin below the tail rotor drive shaft and providing a first central bracket lug in the first engine compartment above the third firewall and a second central bracket lug in the second engine compartment above the third firewall, the first, second, and third firewalls defining fire proof separations between the first and second engine compartments and the tail rotor drive shaft, between the first and second engine compartments, and between the first and second engine compartments and the upper primary skin, respectively, wherein the first engine compartment comprises a first rear mount, a first outboard fixation, and a first inboard fixation that are adapted for receiving a first aircraft engine, and wherein the second engine compartment comprises a second rear mount, a second outboard fixation, and a second inboard fixation that are adapted for receiving a second aircraft engine, wherein the first inboard fixation comprises a first inner main mounting bracket adapted for being rigidly attached to the first aircraft engine, a first inboard main mount that attaches the first inner main mounting bracket with a first beam web of at least one first beam of the predetermined number of supporting beams, and a first inboard lateral mount that attaches the first inner main mounting bracket with the first central bracket lug, and wherein the second inboard fixation comprises a second inner main mounting bracket adapted for being rigidly attached to the second aircraft engine, a second inboard main mount that attaches the second inner main mounting bracket with a second beam web of at least one second beam of the predetermined number of supporting beams, and a second inboard lateral mount that attaches the second inner main mounting bracket with the second central bracket lug.

2. The rotary wing aircraft of claim 1, wherein the central bracket comprises a base that is rigidly attached to the upper primary skin.

3. The rotary wing aircraft of claim 1, wherein the central bracket further comprises first and second firewall attachments that are rigidly attached to the first firewall.

4. The rotary wing aircraft of claim 1, wherein the central bracket further comprises a central bracket web that extends below the upper primary skin and that is rigidly attached to a third beam web of at least one third beam of the predetermined number of supporting beams.

5. The rotary wing aircraft of claim 1, wherein the first inboard lateral mount comprises a first strut that is rotatably mounted to the first central bracket lug via a first spherical bearing, and wherein the second inboard lateral mount comprises a second strut that is rotatably mounted to the second central bracket lug via a second spherical bearing.

6. The rotary wing aircraft of claim 5, wherein the first strut is further rotatably mounted to the first inner main mounting bracket via a third spherical bearing, and wherein the second strut is further rotatably mounted to the second inner main mounting bracket via a fourth spherical bearing.

7. The rotary wing aircraft of claim 6, wherein a first axis through the first and third spherical bearings and a second axis through the second and fourth spherical bearings intersect at the upper primary skin below the tail rotor drive shaft.

8. The rotary wing aircraft of claim 7, wherein the first axis forms a first angle with the upper primary skin, wherein the second axis forms a second angle with the upper primary skin, and wherein the first angle and the second angle have a same value.

9. The rotary wing aircraft of claim 8, wherein the first angle is between 25° and 55°.

10. The rotary wing aircraft of claim 1, further comprising first and second support ribs that are located between the upper primary skin and the third firewall, respectively, and rigidly attached to the upper primary skin.

11. The rotary wing aircraft of claim 10, wherein the central bracket further comprises a first rib attachment that is rigidly attached to the first support rib, and a second rib attachment that is rigidly attached to the second support rib.

12. The rotary wing aircraft of claim 10, wherein the first inboard main mount comprises a first inner main mount bracket with a first main mount web that is rigidly attached to the first support rib and the second inboard main mount comprises a second inner main mount bracket with a second main mount web that is rigidly attached to the second support rib.

13. The rotary wing aircraft of claim 12, wherein the first inboard main mount comprises a first inner main mount that is rotatably mounted to the first inner main mounting bracket, and wherein the second inboard main mount comprises a second inner main mount that is rotatably mounted to the second inner main mounting bracket.

14. The rotary wing aircraft of claim 13, wherein the first inner main mount bracket extends through the third firewall and comprises first and second main mount lugs, and wherein the second inner main mount bracket extends through the third firewall and comprises third and fourth main mount lugs.

15. The rotary wing aircraft of claim 14, wherein the first inner main mount is attached to the first and second main mount lugs, and wherein the second inner main mount is attached to the third and fourth main mount lugs.

* * * * *